(12) United States Patent
Carr et al.

(10) Patent No.: US 11,140,828 B2
(45) Date of Patent: Oct. 12, 2021

(54) GRAIN FEEDING AND CONVEYING ASSEMBLY FOR A COMBINE

(71) Applicant: Gary W. Clem, Inc., Nevada, IA (US)

(72) Inventors: Brian W. Carr, Ames, IA (US); Scott A. Sporrer, Nevada, IA (US); Adam R. Koesters, Earling, IA (US); Ryan A. Carstensen, Bondurant, IA (US); Cody J. Sobotka, Ankeny, IA (US)

(73) Assignee: Gary W. Clem, Inc., Nevada, IA (US)

(*) Notice: Subject to any disclaimer, the term of this patent is extended or adjusted under 35 U.S.C. 154(b) by 377 days.

(21) Appl. No.: 16/385,055

(22) Filed: Apr. 16, 2019

(65) Prior Publication Data

US 2019/0239435 A1    Aug. 8, 2019

Related U.S. Application Data

(63) Continuation of application No. 14/745,821, filed on Jun. 22, 2015, now Pat. No. 10,412,894.

(51) Int. Cl.
| | | |
|---|---|---|
| *A01F 12/10* | (2006.01) | |
| *A01D 61/00* | (2006.01) | |
| *A01F 7/06* | (2006.01) | |
| *A01F 12/18* | (2006.01) | |

(52) U.S. Cl.
CPC ............ *A01F 12/10* (2013.01); *A01D 61/008* (2013.01); *A01F 7/06* (2013.01); *A01F 12/18* (2013.01)

(58) Field of Classification Search
CPC ........ A01D 41/06; A01D 57/06; A01D 57/20; A01D 61/00; A01D 61/008; A01D 61/02; A01D 65/00; A01D 87/02; A01F 7/06; A01F 12/10; A01F 12/18
See application file for complete search history.

(56) References Cited

U.S. PATENT DOCUMENTS

| | | | | |
|---|---|---|---|---|
| 858,696 | A * | 7/1907 | Anderson et al. | A01D 61/008 56/124 |
| 1,744,335 | A * | 1/1930 | Schlayer | A01F 7/06 460/80 |
| 2,133,396 | A * | 10/1938 | Neal | A01D 61/008 198/608 |
| 2,400,667 | A * | 5/1946 | Toews | A01D 61/02 144/250.12 |
| 2,518,521 | A * | 8/1950 | Carroll | A01D 61/008 56/158 |
| 3,967,719 | A | 7/1976 | Kloefkorn et al. | |
| 4,271,877 | A | 6/1981 | Whitaker et al. | |
| 4,611,606 | A * | 9/1986 | Hall | A01F 12/442 460/80 |
| 5,413,531 | A | 5/1995 | Tanis | |
| 5,551,215 | A | 9/1996 | McDonald et al. | |
| 5,497,605 | A * | 12/1996 | Underwood | A01D 41/06 56/14.6 |

(Continued)

*Primary Examiner* — Adam J Behrens
(74) *Attorney, Agent, or Firm* — Zarley Law Firm, P.L.C.

(57) ABSTRACT

A grain processing assembly for a combine that comprises a feeder assembly, a threshing assembly having a rotor disposed within a housing, a hood. The feeder assembly comprises a lower conveyor and an upper conveyor. The position of the lower conveyor and the upper conveyor is such that upper conveyor assists the lower conveyor in directing crop material being transported on the lower conveyor towards a discharge end of the lower conveyor. The hood engages a belt of the second upper conveyor.

18 Claims, 2 Drawing Sheets

(56) References Cited

U.S. PATENT DOCUMENTS

| | | | |
|---|---|---|---|
| 5,664,402 A | 9/1997 | Sandvik et al. | |
| 6,325,714 B1 | 12/2001 | Tanis et al. | |
| 6,979,261 B1 | 12/2005 | Day et al. | |
| 7,811,162 B2 | 10/2010 | Flickinger | |
| 8,157,629 B2 | 4/2012 | Yanke et al. | |
| 8,821,229 B2 | 9/2014 | Stan et al. | |
| 9,301,450 B2* | 4/2016 | Boyd | B65G 23/44 |
| 2004/0112025 A1* | 6/2004 | Claeys | A01D 61/008 56/16.4 R |
| 2007/0197272 A1* | 8/2007 | Ramp | A01D 12/00 460/16 |
| 2007/0251203 A1* | 11/2007 | Coers | A01D 61/02 56/181 |
| 2009/0113867 A1 | 5/2009 | Birrell et al. | |
| 2012/0184339 A1 | 7/2012 | Schulz | |
| 2013/0313077 A1* | 11/2013 | Boyd | A01D 61/008 198/617 |
| 2013/0337876 A1* | 12/2013 | Johnson | A01F 12/18 460/66 |

* cited by examiner

GRAIN FEEDING AND CONVEYING ASSEMBLY FOR A COMBINE

CROSS REFERENCE TO RELATED APPLICATION

This application is a continuation of pending application Ser. No. 14/745,821, filed Jun. 22, 2015, the contents of this application is hereby incorporated by reference in its entirety.

BACKGROUND OF THE INVENTION

This invention is directed to a grain processing assembly for a combine and more particularly to a top feed grain processing assembly.

Grain processing assemblies for combines are well known in the art. Present assemblies include, in part, a feeder assembly that delivers crop material to the bottom of a threshing assembly. In this arrangement, crop material can become plugged, clogged, or stuck on the feeder assembly. In addition, residual grain can become trapped in the threshing assembly and feeder assembly. This is particularly a problem with seed research plot combines where contamination between different seeds must be avoided. As such, a need exists in the art for an assembly that addresses these needs.

Therefore, an objective of the present invention is to provide a grain processing assembly where crop material is fed to the top of a threshing assembly.

A further objective of the present invention is to provide a grain processing assembly that reduces or eliminates cross contamination.

These and other objectives will be apparent to one of ordinary skill in the art based upon the following written description, drawings and claims.

SUMMARY OF THE INVENTION

A grain processing assembly for a combine having a feeder assembly and a thresher assembly. The feeder assembly has a first conveyor having an input end and a discharge end and a second conveyor positioned above the first conveyor.

The thresher assembly has a rotatable rotor disposed within a housing. The housing has an opening that is positioned adjacent to and below the discharge end of the feeder assembly so that crop material falls from the discharge end into the threshing assembly.

DETAILED DESCRIPTION OF THE PREFERRED EMBODIMENTS

Figure 1:
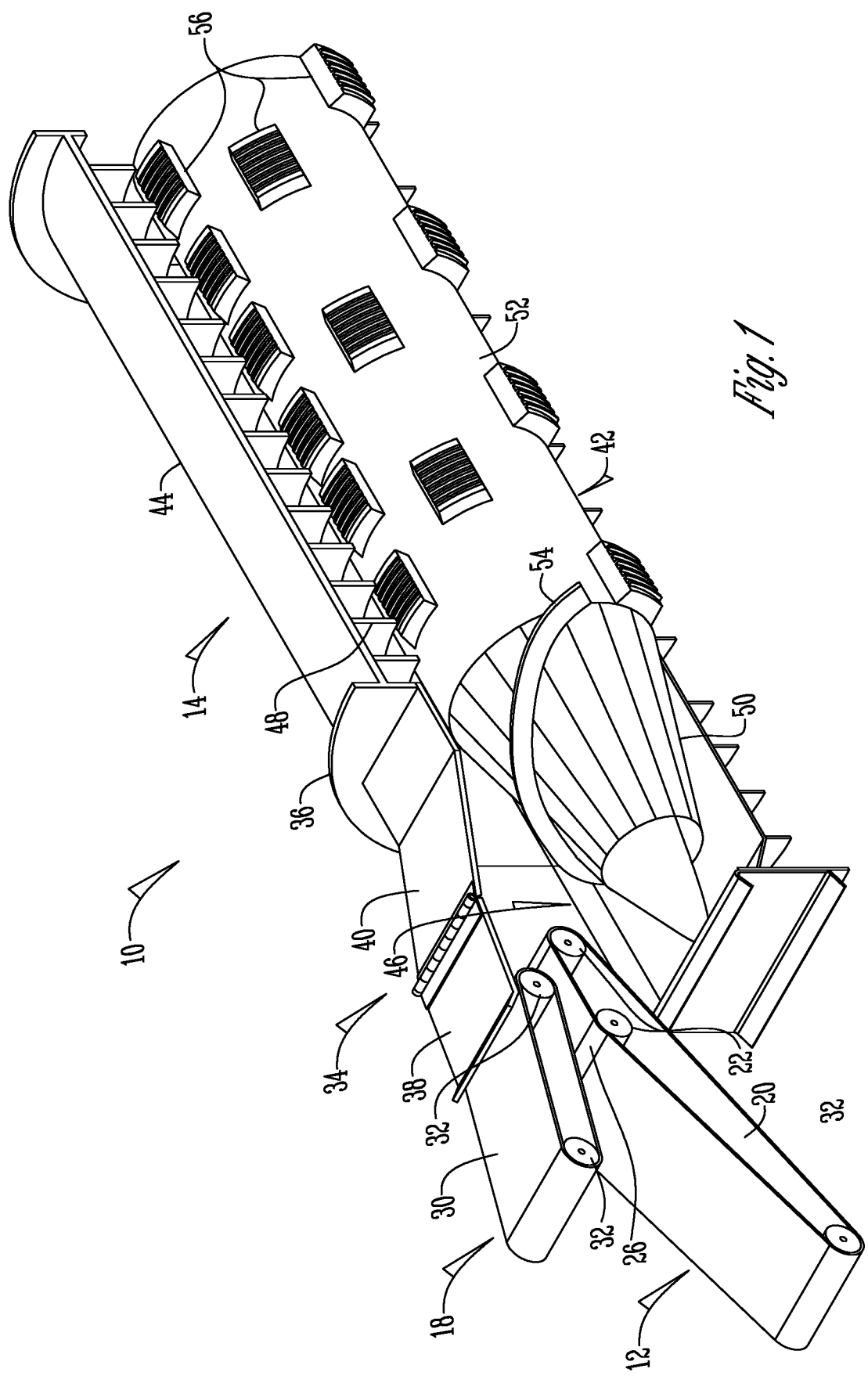
FIG. 1 is a perspective sectional view of a grain processing assembly.
Figure 2:
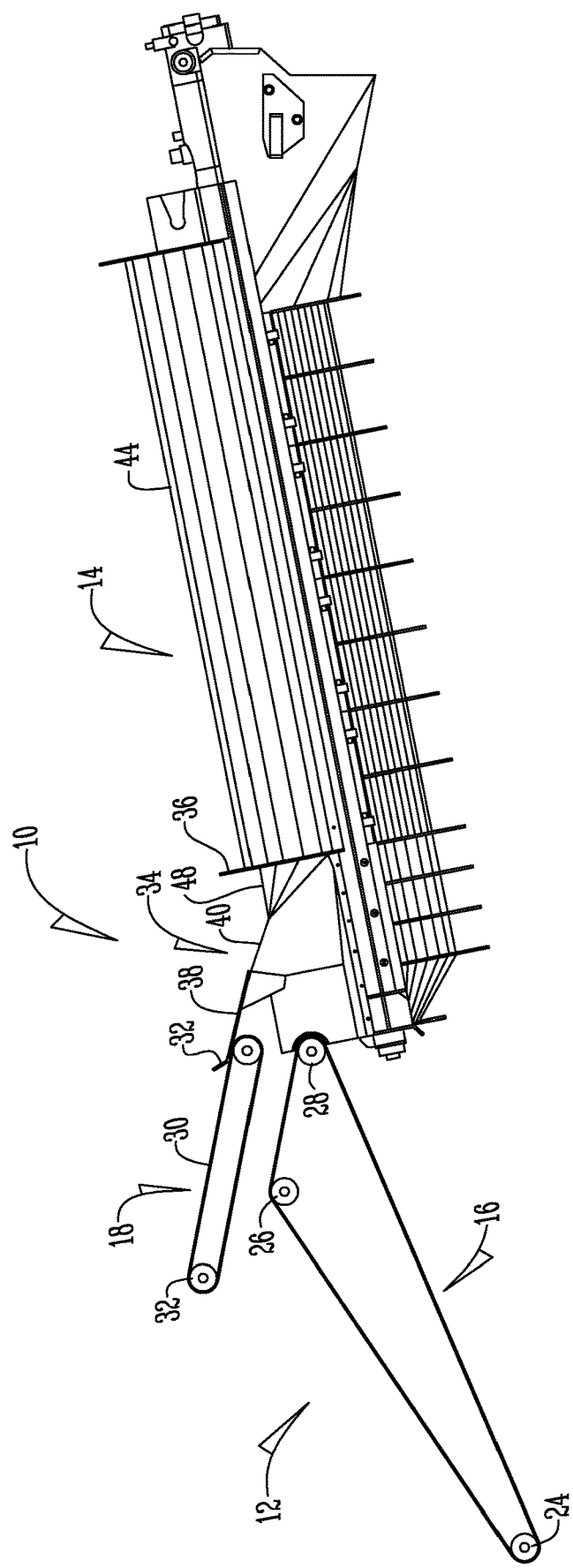
FIG. 2 is a side view of a grain processing assembly.

Referring to the Figures, a grain processing assembly 10 for use with a combine include a feeder assembly 12 and a threshing assembly 14. The feeder assembly 12 includes a lower first conveyor 16 and an upper second conveyor 18. The first conveyor 16 has a continuous belt 20 mounted about a plurality of pulleys 22. Preferably, the position of one or more pulleys 22 are adjustable to change the angles of the conveyor 16.

Generally, the first conveyor 16 angles upwardly from an input end 24 to a transition point 26. From the transition point 26 to the discharge end 28 the first conveyor 16 changes angle. The discharge end 28 of the first conveyor is positioned above or on top of the thresher assembly 14 so that grain falls into the thresher assembly 14. The second conveyor 18 is positioned above a portion of the first conveyor 16 and includes a continuous belt 30 mounted about a plurality of pulleys 32. Pulleys 32 are also adjustable to change position in order to change the angle of the second conveyor 18.

Engaging the second conveyor 18 is an adjustable hood 34. The hood 34 extends to and is connected to a first end 36 of the thresher assembly 14. The hood 34 has a first plate 38 that is hingedly connected to a second plate 40.

The thresher assembly 14 includes a rotor 42 that rotates about a longitudinal axis. The rotor 42 is disposed within a housing 44 that has an opening 46 on a top portion 48 at the first end 36 of the thresher assembly 14 adjacent the discharge end 28 of the feeder assembly 12. The housing 44 has a conventional concave and grate configuration. The rotor 42 has a front portion 50 and a rear portion 52. The front portion 50 tapers outwardly from an end toward the rear portion 52. The front portion 50 has an impeller blade 54 that spirally wraps around the front tapered portion 50. The rear portion 52, which is generally uniform in diameter, has a plurality of thresher members 56.

In operation, crop material is transported on the first conveyor 16 from the input end 24 to the discharge end 28. The second conveyor 18 assists in directing the crop material to the discharge end. At the discharge end 28 the crop material falls through the opening 46 in the housing 44 to the front portion 50 of the rotor 42. The hood 34 assists in directing crop material through the opening 46 and is adjustable to change the angle of deflection.

The impeller blade 54 sweeps the lower portion of the adjacent feed assembly moving crop material & residual grain toward the rear portion 52. The thresher members 56 then engage the crop material to separate the grain which falls through the housing.

Accordingly, a grain processing assembly for a combine has been disclosed that at the very least meets all the stated objectives. In particular, by feeding crop material to the top of the threshing assembly the likelihood of residual crop material left in the feeder assembly is reduced or eliminated. Also, the possibility of cross contamination of seed is eliminated.

What is claimed is:

1. A grain processing assembly for a combine, comprising:
    a feeder assembly having a first lower conveyor with an input end and a discharge end and a second upper conveyor above the discharge end of the first lower conveyer, wherein the second upper conveyor is positioned to assist the first lower conveyor in directing crop material being transported on the first lower conveyor to the discharge end of the first lower conveyor;
    a threshing assembly having a rotor disposed within a housing wherein the housing has an opening positioned adjacent to and below the discharge end of the first lower conveyor; and
    a hood physically engaging a belt of the second upper conveyor and extending to and connected to a first end of the thresher assembly.

2. The grain processing assembly of claim 1 further comprising the first lower conveyor having a continuous belt mounted about a plurality of pulleys.

3. The grain processing assembly of claim 2 further comprising the belt of the second upper conveyor is mounted about a plurality of pulleys.

4. The grain processing assembly of claim 1 wherein the rotor is configured to rotate about a longitudinal axis.

5. The grain processing assembly of claim 1 wherein the hood is adjustable.

6. The grain processing assembly of claim 5 where the hood has a first plate hingedly connected to a second plate so that the first plate extends outwardly away from the second plate and the first end of the thresher assembly and the second plate is positioned between the first plate and the first end of the thresher.

7. The grain processing assembly of claim 5 wherein the hood is configured to deflect the crop material through the opening.

8. The grain processing assembly of claim 5 wherein the hood is configured to adjust an angle of deflection.

9. The grain processing assembly of claim 1 wherein the hood physically engages a top of the belt of the second upper conveyor.

10. The grain processing assembly of claim 1 wherein the rotor extends from a front portion to a rear portion, wherein the front portion tapers outwardly towards the rear portion.

11. The grain processing assembly of claim 10 further comprising impeller blades spiraling wrapped around the front portion.

12. The grain processing assembly of claim 10 wherein the rear portion has a generally uniform diameter.

13. The grain processing assembly of claim 1 wherein the first lower conveyor is configured to change angle from a transition point to the discharge end in relation to an angle of the first lower conveyor between the input end to the transition point.

14. A grain processing assembly for a combine, comprising:

a feeder assembly having a first lower conveyor with an input end and a discharge end;

a second upper conveyor positioned above the first lower conveyor, wherein the second upper conveyor is positioned to assist the first lower conveyor in directing crop material being transported on the first lower conveyor to the discharge end of the first lower conveyor;

a threshing assembly having a rotor disposed within a housing;

the housing having an opening on a top portion at a first end of the housing, wherein the opening is positioned adjacent to and below the discharge end of the first lower conveyor such that crop material falls through the opening upon exiting the discharge end of the first lower conveyor; and a hood having a first plate hingedly connected to a second plate, wherein the second plate is directly connected to a first end of the thresher assembly and the first plate extends away from the second plate and the first end of the thresher assembly in the same direction such that the first plate extends over a belt of the second upper conveyor.

15. The grain processing assembly of claim 14 wherein the first plate and the second plate are configured to direct the crop material through the opening in the housing toward a front of the rotor.

16. The grain processing assembly of claim 14 further comprising the first lower conveyor having a continuous belt mounted about a plurality of pulleys.

17. The grain processing assembly of claim 14 wherein the first plate is adjustable such that an angle of deflection is changeable.

18. The grain processing assembly of claim 14 wherein the first lower conveyor is configured to change angle from a transition point to the discharge end in relation to an angle of the first lower conveyor between the input end to the transition point.

* * * * *